US008340838B2

United States Patent
Regis et al.

(10) Patent No.: US 8,340,838 B2
(45) Date of Patent: Dec. 25, 2012

(54) DIFFERENTIAL BRAKING SYSTEM

(75) Inventors: Olivier Regis, Toulouse (FR); Kevin Scott, Frouzins (FR); Gregory Sicault, Fonsorbes (FR)

(73) Assignee: Airbus Operations SAS, Toulouse (FR)

( * ) Notice: Subject to any disclaimer, the term of this patent is extended or adjusted under 35 U.S.C. 154(b) by 976 days.

(21) Appl. No.: 12/168,975

(22) Filed: Jul. 8, 2008

(65) Prior Publication Data

US 2009/0069958 A1 Mar. 12, 2009

(30) Foreign Application Priority Data

Sep. 7, 2007 (FR) ..................................... 07 56354

(51) Int. Cl.
*B64C 19/00* (2006.01)
*B64C 25/42* (2006.01)
*G06F 17/00* (2006.01)
*B62D 6/00* (2006.01)

(52) U.S. Cl. ................ 701/3; 701/41; 701/48; 244/111; 244/76 R

(58) Field of Classification Search .................. 701/1, 3, 701/4, 41, 48, 70, 71, 72, 74, 78, 81; 244/100 R, 244/102 A, 111, 75.1, 76 R
See application file for complete search history.

(56) References Cited

U.S. PATENT DOCUMENTS

| 2,943,820 A | 7/1960 | Westcott, Jr. |
| 2006/0186267 A1 | 8/2006 | Steiner et al. |

FOREIGN PATENT DOCUMENTS

WO 2007054715 A1 5/2007

OTHER PUBLICATIONS

International Search Report dated Jan. 31, 2008.

*Primary Examiner* — Thomas Tarcza
*Assistant Examiner* — Edward Pipala
(74) *Attorney, Agent, or Firm* — Perman & Green, LLP

(57) ABSTRACT

A braking system for the landing gear of an aircraft, which landing gear includes a bogey containing at least four wheels, each equipped with a brake, with the bogey having at least two axles that are connected to the aircraft by a telescoping strut, wherein when the aircraft makes a low-speed turn around a center of rotation, the straight line linking the center of rotation of the turn to the barycenter of the landing gear does not pass between the front wheels and the rear wheels of the landing gear which system further includes means for applying differential braking between the front wheels and the rear wheels of the landing gear.

8 Claims, 4 Drawing Sheets

DIFFERENTIAL BRAKING SYSTEM

BACKGROUND

1. Field

The disclosed embodiments relate to a differential braking system for an aircraft, making it possible to select, from among the different wheels of a landing gear, the wheels to be braked and those not to be braked when the aircraft terms, during low-speed maneuvers, including, in particular, a turn, so as to reduce the loads applied to the landing gear of the said aircraft.

The disclosed embodiments are applicable to the field of aeronautics, and, more specifically, is intended for the landing gear of heavy aircraft.

2. Brief Description of Related Developments

The undercarriage of such aircraft consists of a main undercarriage and a forward undercarriage. The main undercarriage consists of at least two landing gear (left and right), customarily mounted on either side of the fuselage or under the wings, or else consists of three, four, or five landing gear, two of which are mounted under the wings all the others are mounted under the fuselage. The nose undercarriage is mounted at the front of the aircraft, near the nose. Each main landing gear includes a set of twin bogeys containing at least 4 wheels, each of which wheels is equipped with a brake. The bogey consists of at least two axles that are connected to the fuselage or to the wings by a telescoping strut. The wheels of these landing gear either are or are not steerable. The forward undercarriage includes a steerable shock absorber equipped with twin wheels. Its primary purpose is to guide the aircraft on the ground, and [it] supports only a small fraction of the weight of the aircraft.

When the aircraft rolls in a straight line on the runway, the wheels are displaced according to the axis of symmetry of the bogeys, and the only forces of resistance to the displacement of the aircraft that are applied to these wheels are the braking forces when the brakes are applied, and the rolling friction.

When the aircraft turns, new efforts appear. In point of fact, the wheels of the landing gear are subjected to a force consisting of a longitudinal horizontal braking force [Fx] if the brakes are applied, and a lateral force [Fy]. For landing gear whose center of rotation of the turn passes between the front wheels and the rear wheels, the direction of the lateral forces that are developed on the front wheels of the landing gear is opposite to the direction of the lateral forces developed on the rear wheels of the landing gear. The resultant of these two forces, in opposite directions, applied to these two axles creates a torsion moment at the center of the landing gear. This torsion on the strut tends to oppose the direction of the turn being made by the aircraft.

Consequently, during a low-speed turn in which the direction of the displacement is no longer in the plane of symmetry of the bogeys, in addition to the vertical and longitudinal loads applied to the strut, torsion stress is also applied to the strut.

This torsion stress applied to the struts of the landing gear increases the fatigue damage to the strut of the landing gear and accelerates the wear of the tires. This is stress also opposes the rotation of the aircraft and makes the act of turning more difficult.

SUMMARY

The disclosed embodiments makes it possible to reduce this torsion stress applied to the strut of the landing gear in question by eliminating or significantly reducing the formation of these efforts in opposite directions, doing so by applying differential braking to the different wheels of the landing gear.

Advantageously, in comparison with a standard tight turn in which all the wheels of the landing gear located on the inside of the turn are braked, for those landing gear in which the center of rotation of the term does not pass between the front wheels and the rear wheels this differential braking system also makes it possible to reduce the lateral and longitudinal loads applied to the landing gear in question. The optimization of the torsion effort and of the lateral and longitudinal loads applied to the landing gear makes it possible to reduce the wear on the tires, thus leading to a reduction in overall maintenance costs.

The principle of the disclosed embodiments will now be described. The differential braking system consists of preferentially braking the wheels that are closest to the center of rotation when a turn is made by an aircraft rolling at low speed, with the center of rotation of the turn passing between the front axle and the rear axle. The purpose of this first type of differential braking between the wheels of a single landing gear is to reduce the torque applied to the strut of the landing gear. In the second configuration, in which the center of rotation of the turn does not pass between the front axle and the rear axle, the differential braking system consists of preferentially braking the wheels of the front axle or the wheels of the rear axle of the landing gear in question. This second type of differential braking makes it possible to optimize the lateral efforts applied to the strut of the landing gear and to encourage the turning of the aircraft.

The differential braking system also includes a differential braking calculator that makes it possible to integrate the differential braking system directly into the brake control system. The differential braking [system] uses any electronic, electric, mechanical, hydraulic, etc. means that allow it to be implemented. For example, this calculator may send instructions in the form of a command to the solenoid valves of each brake.

For this purpose, the disclosed embodiments relate to a braking system for the landing gear of an aircraft, which landing gear includes a bogey containing at least four wheels, each equipped with a brake, with the said bogey consisting of at least two axles that are connected to the aircraft by a telescoping strut, characterized in that the said system includes means for applying differential braking between the wheels of the said landing gear when the aircraft makes a low-speed turn around a center of rotation [O].

In a first embodiment, in which the straight line linking the said center of rotation [O] of the turn to the barycenter of the landing gear passes between the front wheels and the rear wheels of the landing gear, the system further includes means for applying differential braking between the wheels that are the nearest to, and the wheels that are the farthest from, the said center of rotation [O].

In a second embodiment, in which the straight line linking the said center of rotation [O] of the turn to the barycenter of the landing gear does not pass between the front wheels and the rear wheels of the landing gear, the braking system further includes means for applying differential braking between the front wheels and the rear wheels of the said landing gear.

The means for applying the differential braking advantageously include a differential braking calculator making it possible to select, from among the different wheels of each landing gear, the wheels to be braked and those not to be braked when the aircraft makes a turn, in accordance with the centering of the wheels of the landing gear in relation to the straight line linking the center of rotation [O] of the turn to the barycenter of the landing gear of the aircraft.

The disclosed embodiments also relate to an aircraft including at least two [sets of] landing gear, with each landing gear including at least four wheels, and with each of the wheels being equipped with a brake that is actuated by means of an actuator in order to control the opening or closing of a valve located between a hydraulic [fluid] distributor and a hydraulic brake line feeding the brake, which actuator is activated remotely by brake controls located in the cockpit, characterized in that the said actuator for each brake is connected to the said brake controls by means of the differential braking calculator of the differential braking system that selects the activation of the said actuators.

The disclosed embodiments will be better understood through a reading of the following description and through reference to the accompanying figures, which are provided solely for illustrative purposes and which in no way limit the invention.

The disclosed embodiments provide a landing-gear braking system that includes means for applying differential braking between the wheels of a landing gear in order to reduce the torsion stress applied to the telescoping strut of the landing gear and the lateral loads applied to the landing gear when an aircraft makes a turn.

DETAILED DESCRIPTION OF THE DRAWINGS

Figure 1:
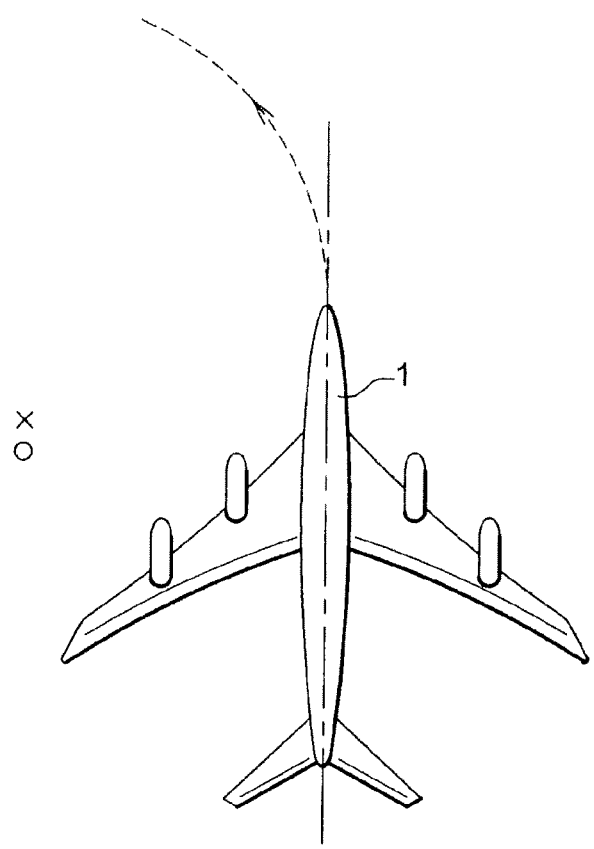
FIG. 1 is a schematic top view of an aircraft in rolling position on a runway, at the start of a turn to the left around a center of rotation [O]

FIG. 1 illustrates an example of the configuration of a turn in which the aircraft [1] starts a turn to the left around a center of rotation [O] of the turn, represented by an X. This is the turn configuration that will be adopted for the remainder of the description.

Figure 2:
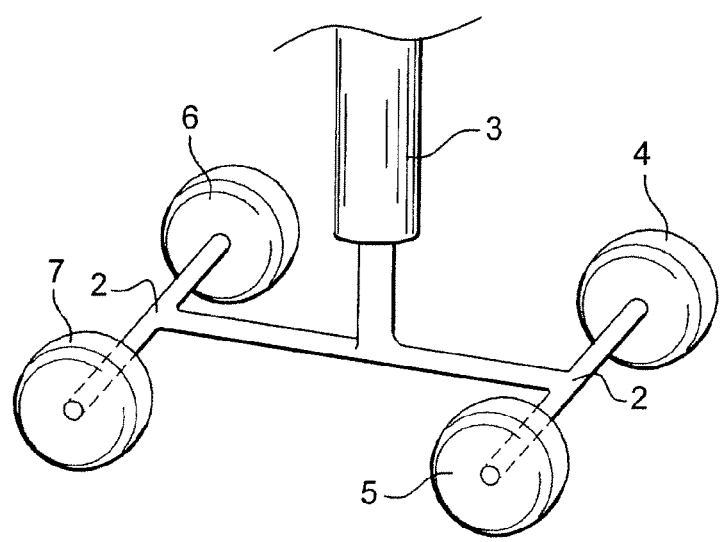
FIG. 2 is a schematic example of landing gear including four wheels and a telescopic strut allowing the axles to be connected to the aircraft.

FIG. 2 contains a schematic illustration of the landing gear, which includes a bogey consisting of two axles [2]. A telescoping strut [3] connecting the axles [2] to the aircraft makes it possible to return the landing gear to, or remove the landing gear from, the housing provided for this purpose in the wing or in the fuselage. The landing gear shown in the figure includes four wheels affixed to the extremities of the axles, which either are or are not steerable. The number of wheels is not limited to four, and each of the wheels either is or is not equipped with a brake. The telescoping strut [3] is located in the center of the four wheels.

Figure 3A:
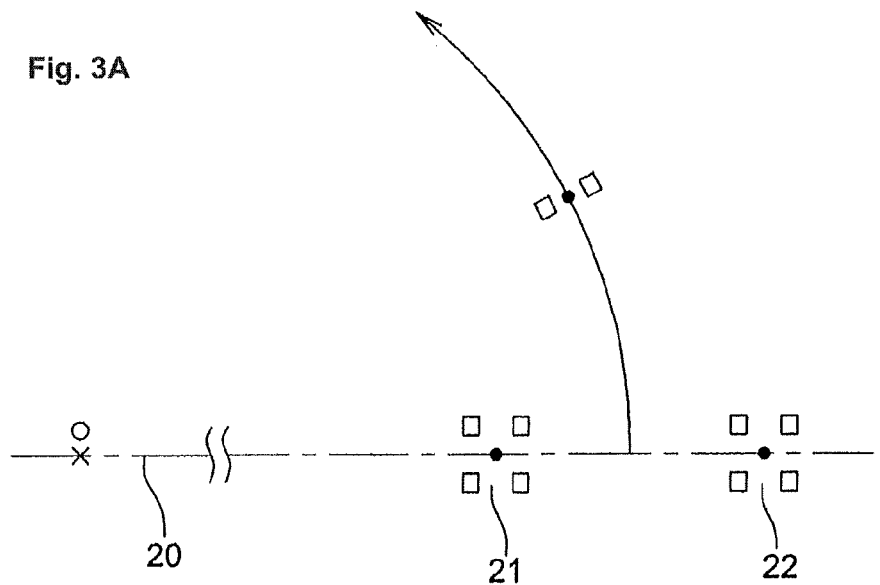
FIG. 3A is a schematic illustration of a first configuration in which the straight line linking the center of rotation [O] of the turn to the barycenter of the landing gear passes between the front wheels and the rear wheels of the two (left and right) landing gear of the aircraft.
Figure 3B:
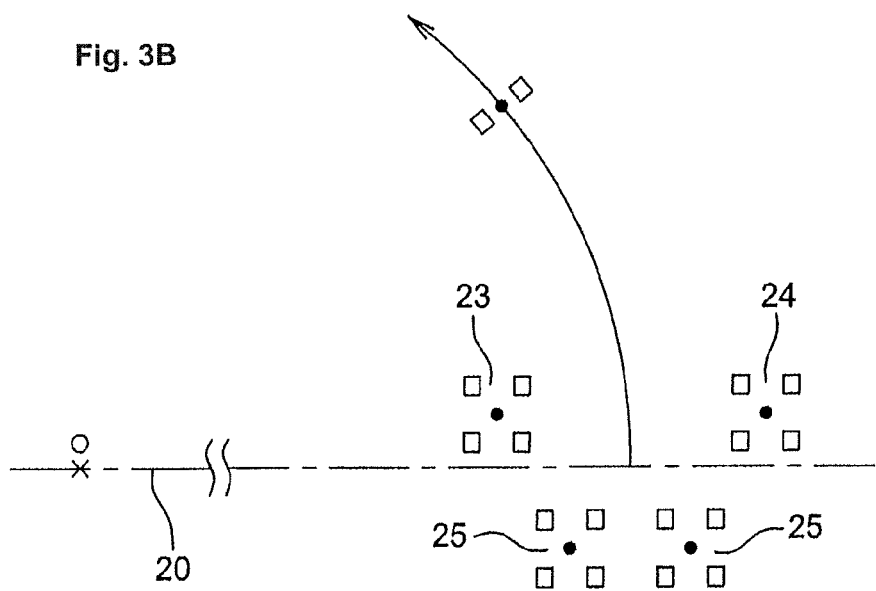
FIG. 3B is a schematic illustration of a second configuration in which the straight line linking the center of rotation [O] to the barycenter of the landing gear does not pass between the front wheels and the rear wheels of the four landing gear.

FIG. 3 is a schematic illustration of two types of configurations [A] and [B] with regard to the positioning of such landing gear in relation to a turning axis [20] that passes through the center of rotation [O]. In the first configuration [A], in which the aircraft has two [sets of] landing gear [21, 22], the straight line linking the center of rotation to the barycenter of the main landing gear passes between the front wheels and the rear wheels of the two landing gear; in this case the telescoping strut [3] of the landing gear is positioned on this straight line [20]. In the second configuration [B], in which the aircraft has four [sets of] landing gear [23, 24, 25, 26], the straight line linking the center of rotation to the barycenter of the main landing gear does not pass between the front wheels and the rear wheels, such that the strut [3] is not positioned on this straight line [20].

When the aircraft makes a low-speed turn around a center of rotation [O], if the braking is applied uniformly to all of the wheels of the landing gear, each of the wheels is subjected to a lateral force [Fy] and a braking force [Fx].

Figure 4:
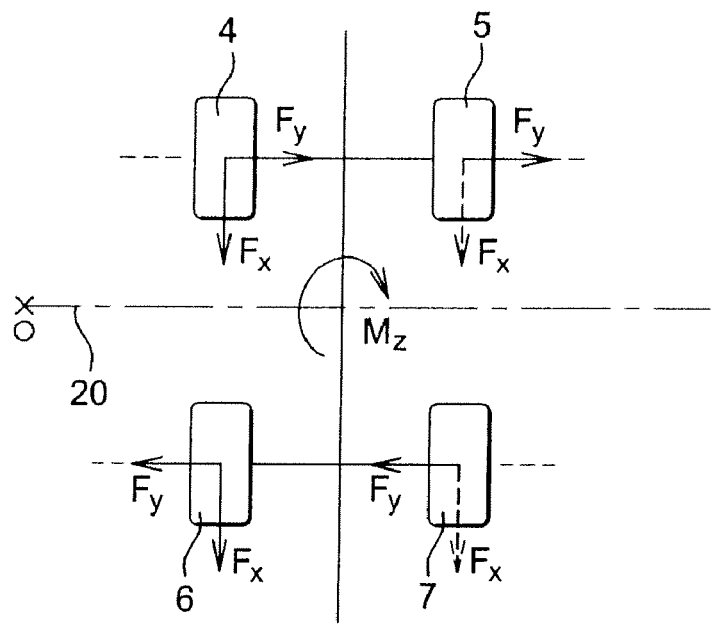
FIG. 4 is a schematic illustration of the force is applied to the four wheels of a landing gear in a first configuration [A]

According to FIG. 4, which represents the first configuration [A] of the landing gear in relation to the straight line [20], the direction of the lateral forces [Fy] for the wheels [4] and [5] is opposite to the direction of the lateral forces [Fy] for the wheels [6] and [7]. Thus, a torque moment [Mz] is applied to the telescoping strut [3] positioned on the straight line [20] that opposes the turn. According to a first embodiment, in order to reduce this torque applied to the strut of each of the landing gear, the differential braking system is applied between the wheels that are the nearest to, and the wheels that are the farthest from, the center of rotation [O] of the turn.

In FIG. 4, the two wheels that are the nearest to the center of rotation [O] are the wheels designated as [6] and [4], and the farthest wheels are the wheels designated as [5] and [7], [such that] the differential braking consists of not braking wheels [5] and [7], so that the braking forces represented here by dashed-line arrows are eliminated. Consequently, the torque moment resulting from the sum of all the forces applied to the four wheels is reduced, thereby reducing the torque applied to the strut.

Figure 5:
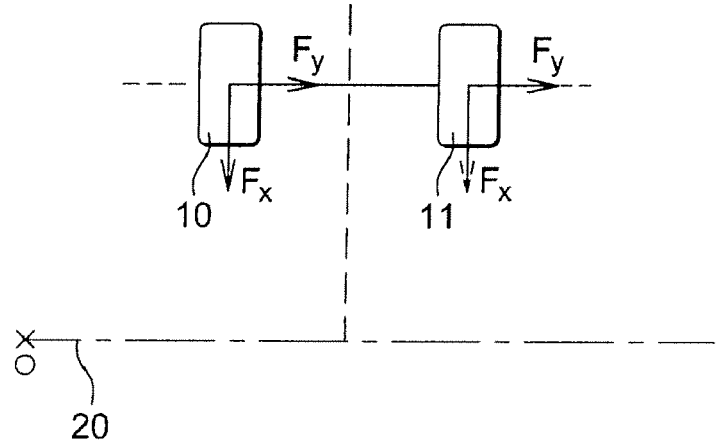
FIG. 5 is a schematic illustration of the force is applied to the four wheels of a landing gear in the second configuration [B]

In FIG. 5, which represents the second configuration [B], the straight line linking the center of rotation of the turn to the barycenter of the main landing gear does not pass between the front wheels and the rear wheels of the landing gear during a low-speed turn. Each wheel is thus subjected to a lateral force [Fy] and a braking force [Fx] if the braking is applied uniformly to the four wheels. However, in this second configuration, the direction of the lateral forces [Fy] for wheels [8] and [9] is not opposite to the direction of the lateral forces [Fy] for wheels [10] and [11]. Thus, during the turn, the sum of the forces places a significant load on the landing gear. According to a second embodiment, in order to optimize the forces applied to the landing gear, the differential braking system applies differential braking between the front wheels and the rear wheels of the landing gear.

In FIG. 5 shows an example of landing gear located beyond the straight line [20] linking the center of rotation of the turn to the barycenter of the main landing gear. The front wheels are the wheels designated as [8] and [9], and the rear wheels are the wheels designated as [10] and [11]. The differential braking consists of not braking the front wheels [8, 9] or the rear wheels [10 and 11]. Thus, the braking forces [Fx] represented by the dashed-line arrows are eliminated. Consequently, the sum of the forces is reduced, and the lateral and longitudinal forces applied to the landing gear are reduced.

According to the disclosed embodiments, the system also includes a differential braking calculator making it possible to control the differential braking among the wheels of any single landing gear. This differential braking calculator [17] is advantageously incorporated directly into a brake control system that is present in the aircraft, so as to allow automatic actuation from the cockpit.

Figure 6:
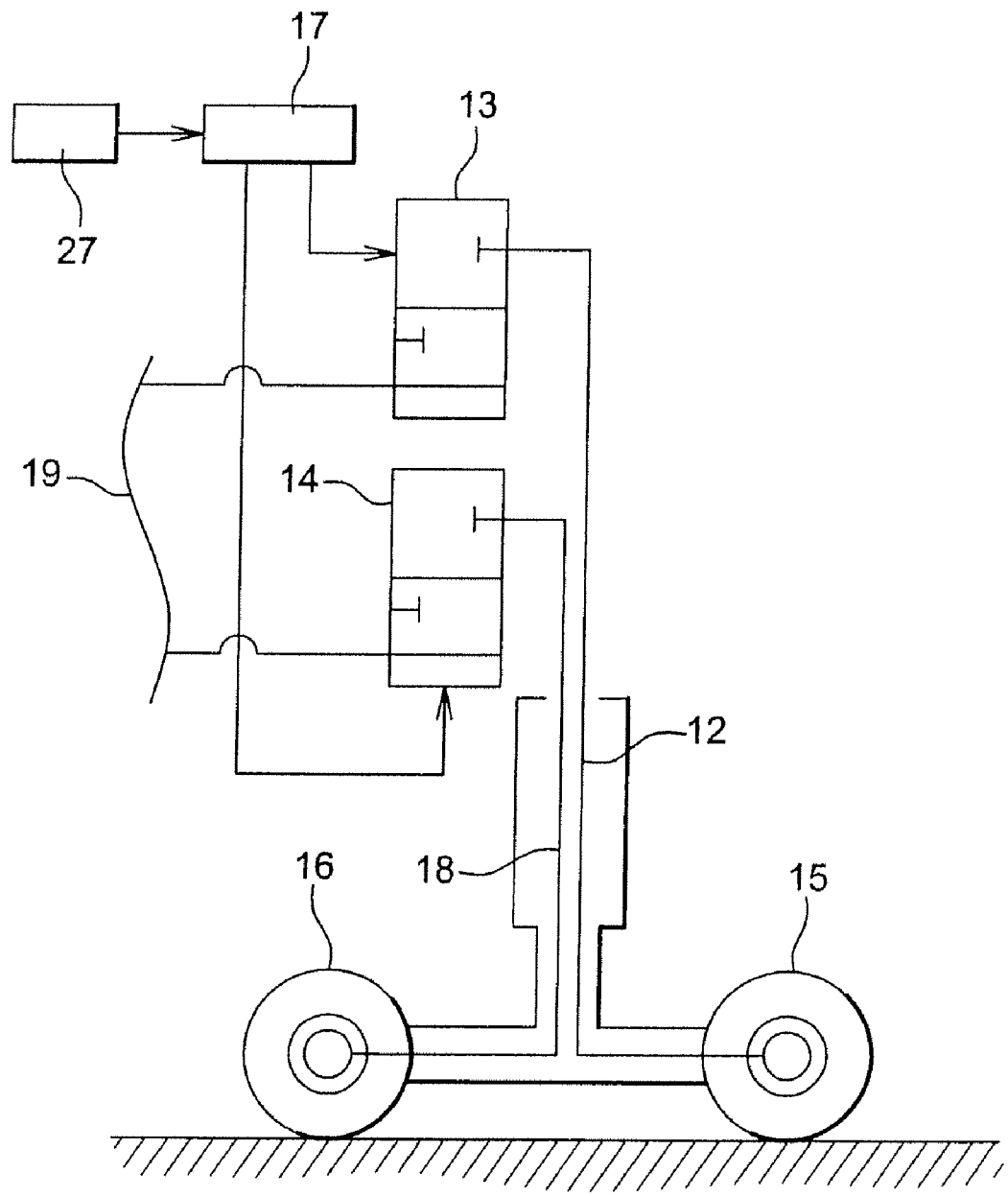
FIG. 6 is a schematic example of the structure of the brake control system.

FIG. 6 is a profile view of an example of the functional diagram of the brake-energy equalization system incorporated into a brake circuit for an aircraft landing gear. Each wheel [15, 16] of the landing gear is equipped with a brake that is actuated by means of an actuator to control the opening and closing of a valve [13, 14] located between a hydraulic [fluid] distributor [19] and a hydraulic brake line [18, 12] feeding, respectively, the brakes of the wheels [15, 16]. The actuators that control the opening and closing of the valves are connected by means of the differential braking calculator [17] to brake controls [27] located in the cockpit.

In FIG. 6, when the differential braking system is activated between the wheels [15 and 16], the braking calculator [17] sends an instruction in the form of a command to the solenoid valve [13], which controls the braking of the wheel [15], to remain open, and [sends an instruction] to the solenoid valve [14], which controls the braking of the wheel [16], to close. Thus, differential braking is applied between the two wheels [15 and 16].

The actuator for each brake is preferably an electrically controlled actuator that controls the closing or the opening of the valve [13, 14] located between the said brake line [18, 12] and the hydraulic [fluid] distributor [19].

The disclosed embodiments are not limited to the two embodiments represented, and, in particular, the differential braking may be combined among the front wheels and the rear wheels of a single landing gear, with differential braking between the wheels that are nearest to the landing gear and the wheels that are farthest from the landing gear among different landing gear, in order to assist the pilot in making turns and in order to reduce the stresses that are applied to all of the [sets of] landing gear.

The invention claimed is:

1. A braking system for an aircraft comprising a landing gear which landing gear includes bogeys containing at least four wheels, each equipped with a brake, with the bogey comprising at least two axles that are connected to the aircraft by a telescoping strut, which system further includes means for applying differential braking between wheels of the landing gears and wherein the means include a differential braking calculator making it possible to select, from among the different wheels of each landing gear, the wheels to be braked and those not to be braked when the aircraft makes a turn, in accordance with the centering of the wheels of the landing gear in relation to the straight line linking the center of rotation of the turn to the barycenter of the landing gear of the aircraft said differential braking calculator being adapted to adapt a differential braking when a straight line linking the center of rotation and the barycenter of the landing gear passes between the front and rear wheels of the bogeys to brake the wheels nearest to the center of the turn and to adapt a differential braking when a straight line linking the center of rotation and the barycenter of the landing gear does not pass between the front and rear wheels of the bogeys to brake front or rear wheels of the bogeys while the respective rear or front wheels are remaining free of braking.

2. An aircraft including at least two sets of landing gear, with each landing gear including at least four wheels, and with each of the wheels being equipped with a brake that is actuated by means of an actuator in order to control the opening or closing of a valve located between a hydraulic fluid distributor and a hydraulic brake line feeding the brake, which actuator is activated remotely by brake controls located in the cockpit, wherein the actuator for each brake is connected to the brake controls by means of the differential braking calculator of the differential braking system according to claim 1.

3. An aircraft according to claim 2, wherein the actuator for each brake is an electrically controlled actuator that controls the opening or closing of a valve located between the brake line and of the hydraulic fluid distributor.

4. A method for reducing torque applied to a strut of an aircraft landing gear during turning wherein said aircraft comprises a braking system for the landing gear, which landing gear includes several bogeys containing at least four wheels, each equipped with a brake, with the said bogeys consisting of at least two axles that are connected to the aircraft by a telescoping strut, which system further includes means for applying differential braking between wheels of the said bogeys, wherein when the aircraft makes a low-speed turn around a center of rotation, for which the straight line linking the center of rotation of the turn to the barycenter of the landing gear does not pass between the front wheels and the rear wheels of a bogey, said braking system applies a differential braking between the front wheel and the rear wheels of said bogey and wherein when the aircraft makes a low-speed turn around a center of rotation, for which the straight line linking the center of rotation of the turn to the barycenter of the landing gear passes between the front wheels and the rear wheels of a bogey said braking system applies a differential braking between wheels closer and farther from the center of the turn.

5. The method according to claim 4, wherein the means including a differential braking calculator, said process comprises selecting, from among the different wheels of each landing gear, the wheels to be braked and those not to be braked when the aircraft makes a turn, in accordance with the centering of the wheels of the landing gear in relation to the straight line linking the center of rotation of the turn to the barycenter of the landing gear of the aircraft.

6. The method according to claim 4 wherein said aircraft includes at least two bogeys, with each bogey including at least four wheels, and with each of the wheels being equipped with a brake that is actuated by means of an actuator in order to control the opening or closing of a valve located between a hydraulic distributor and a hydraulic brake line and the said actuator for each brake is connected to the said brake controls by means of the differential braking calculator of the differential braking system wherein feeding the brakes, which actuator is activated remotely by brake controls located in the cockpit.

7. The method according to claim 6, wherein said actuator for each brake being an electrically controlled actuator, control of the opening or closing of a valve located between the said brake line and of the said hydraulic distributor is done through said electrically controlled actuator.

8. The method according to claim 4 wherein when the center of rotation of the turn to the barycenter of the landing gear passes between the front wheels and the rear wheels of a further bogey, said braking system applies a differential braking between the front wheel and the rear wheels of said further bogey.

* * * * *